United States Patent
Penev et al.

(10) Patent No.: US 8,158,290 B2
(45) Date of Patent: Apr. 17, 2012

(54) RECOVERING A REACTANT FROM A FUEL CELL EXHAUST FLOW

(75) Inventors: Michael Penev, Arnhem (NL); Richard H. Cutright, Corinth, NY (US)

(73) Assignee: Plug Power, Inc., Latham, NY (US)

( * ) Notice: Subject to any disclaimer, the term of this patent is extended or adjusted under 35 U.S.C. 154(b) by 1369 days.

(21) Appl. No.: 11/788,825

(22) Filed: Apr. 20, 2007

(65) Prior Publication Data

US 2007/0259225 A1 Nov. 8, 2007

Related U.S. Application Data

(60) Provisional application No. 60/793,762, filed on Apr. 21, 2006.

(51) Int. Cl.
*H01M 8/04* (2006.01)

(52) U.S. Cl. ........................................ 429/415

(58) Field of Classification Search ........... 429/400–535
See application file for complete search history.

(56) References Cited

U.S. PATENT DOCUMENTS

2003/0162067 A1* 8/2003 McElroy .................. 429/26
2006/0063046 A1* 3/2006 Hu et al. .................. 429/17

FOREIGN PATENT DOCUMENTS

JP 10-308231 * 9/1998

OTHER PUBLICATIONS

Translation of JP 10-308231.*

* cited by examiner

*Primary Examiner* — Stephen Yanchuk
(74) *Attorney, Agent, or Firm* — Heslin Rothenberg Farley & Mesiti P.C.; Victor A. Cardona, Esq.

(57) ABSTRACT

A technique includes lowering a temperature of a cathode exhaust flow from an electrochemical cell to produce a second flow and routing the second flow to a contaminant trap.

7 Claims, 5 Drawing Sheets

RECOVERING A REACTANT FROM A FUEL CELL EXHAUST FLOW

This application claims the benefit under 35 U.S.C. §119 (e) to U.S. Provisional Application Ser. No. 60/793,762, entitled "IMPROVING PHOSPORIC ACID SCRUBBING EFFICIENCY IN A FUEL CELL SYSTEM," which was filed on Apr. 21, 2006, and is hereby incorporated by reference in its entirety.

BACKGROUND

The invention generally relates to recovering a reactant from a fuel cell exhaust flow.

There are many different types of fuel cells, such as proton exchange membrane (PEM) fuel cells, alkaline fuel cells, molten carbonate fuel cells, direct methanol fuel cells, solid oxide fuel cells and phosphoric acid fuel cells. In its basic function, a fuel cell promotes an electrochemical reaction to produce heat, protons, electrons and water.

Phosphoric acid is a component of a phosphoric acid fuel cell, and as such, the reactants that flow through the phosphoric acid fuel cell contact the phosphoric acid. Thus, exhaust streams from the fuel cell typically carry some trace amounts of phosphorus in the form of phosphoric acid, $P_2O_4$, etc.

The exhaust stream from a phosphoric acid fuel cell may contain some concentration of reactants. Therefore, it may be desirable to recover the reactants from the exhaust stream for purposes of improving the fuel cell system's efficiency. A difficulty with this approach, however, is that the exhaust stream contains trace amounts of phosphorus, which may, as examples, poison catalysts of the fuel cell system, as well as contribute to the corrosion of fuel cell system components, such as heat exchangers, plumbing, etc.

SUMMARY

In an embodiment of the invention, a technique includes lowering a temperature of a cathode exhaust flow from an electrochemical cell to produce a second flow and routing the second flow to a contaminant trap.

In another embodiment of the invention, a system includes an electrochemical cell to provide a cathode exhaust flow and a mechanism to lower a temperature of the cathode exhaust flow to produce a second flow. A contaminant trap of the system receives the second flow.

Advantages and other features of the invention will become apparent from the following drawing, description and claims.

DETAILED DESCRIPTION

Figure 1:
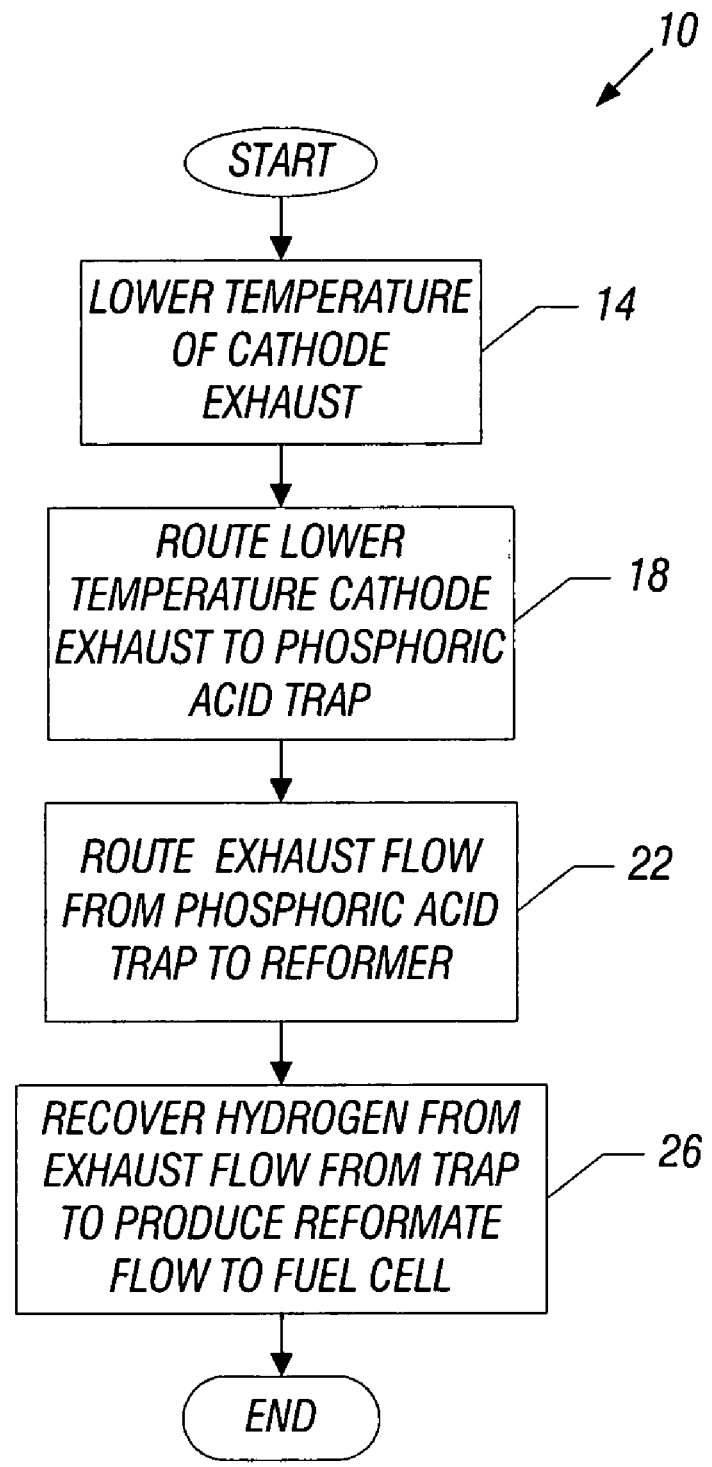
FIGS. 1, 3 and 5 are flow diagrams depicting techniques related to recovering a reactant from a fuel cell exhaust flow according to embodiments of the invention.

In accordance with embodiments of the invention described herein, for purposes of aiding the entrapment of phosphoric acid from a fuel cell exhaust stream, the exhaust stream is first cooled. Therefore, referring to FIG. 1, in accordance with an embodiment of the invention described herein, a technique 10 may be used for purposes of trapping phosphorus from a cathode exhaust flow and recovering a reactant from the stream. The cathode exhaust flow may contain various components, such as hydrogen, methane and carbon monoxide.

Pursuant to the technique 10, the temperature of the cathode exhaust flow is lowered (block 14) and then the lower temperature cathode exhaust flow is routed (block 18) to a phosphoric acid trap. Due to the cooling of the cathode exhaust, the phosphorus is more efficiently removed from the flow. Pursuant to the technique 10, the exhaust flow from the phosphoric acid trap is routed (block 22) to a reformer. The reformer, in turn, recovers hydrogen from the exhaust flow to produce a reformate flow that is furnished back to the fuel cell, pursuant to block 26.

Figure 2:
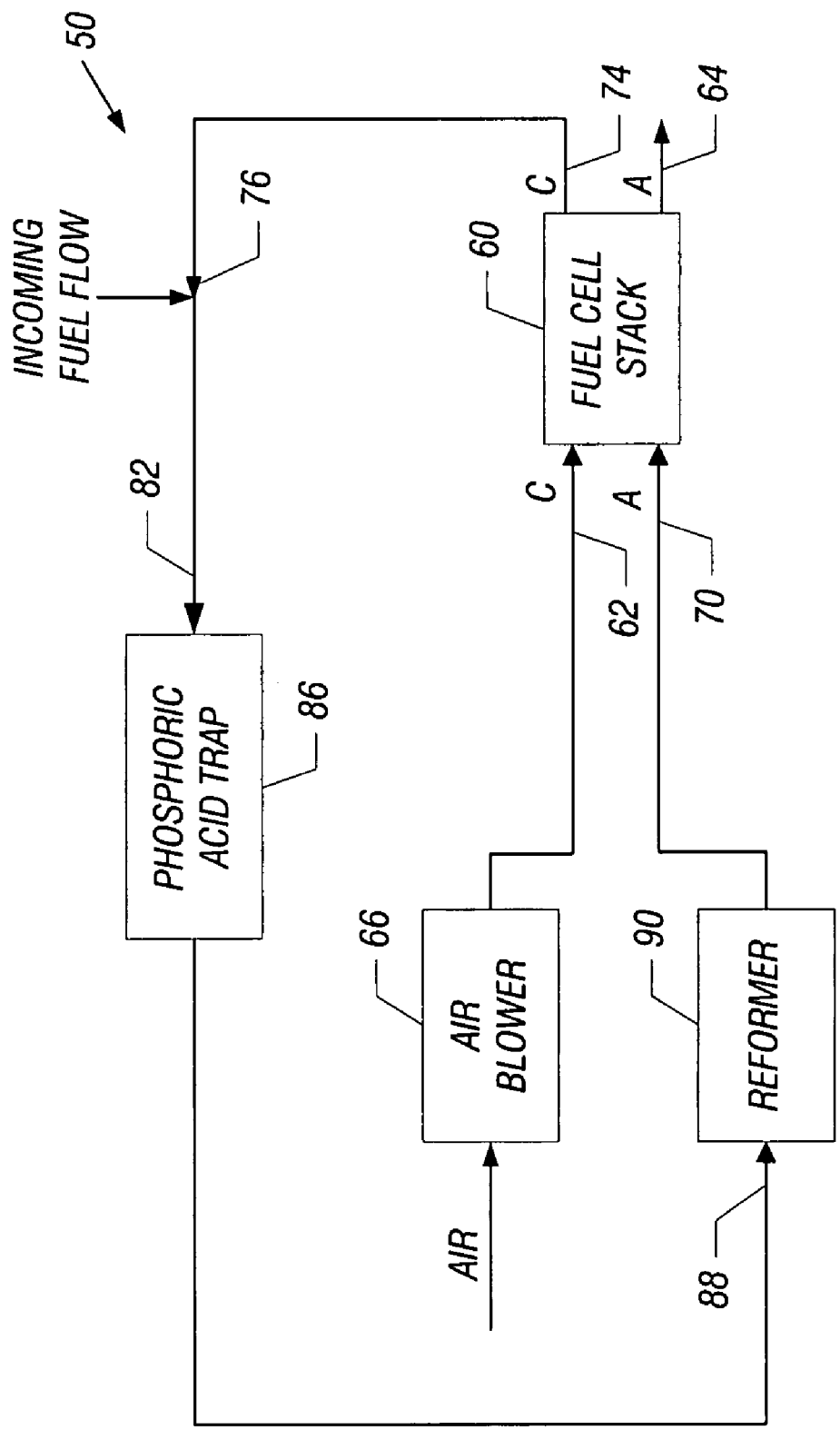
FIGS. 2 and 4 are schematic diagrams of fuel cell systems according to embodiments of the invention.

As a more specific example, FIG. 2 depicts an exemplary embodiment 50 of a fuel cell system in accordance with some embodiments of the invention. The fuel cell system 50 includes a fuel cell stack 60, which may be a stack of phosphoric acid fuel cells, in accordance with some embodiments of the invention. The fuel cell stack 60 has a cathode inlet 62 that receives an incoming oxidant flow from an air blower 66. The fuel cell stack 60 also includes an anode inlet 70, which receives a reformate flow, that is provided by a reformer 90.

The incoming fuel and oxidant flows to the fuel cell stack 60 are communicated through the respective anode and cathode chambers of the fuel cell stack 60 to promote electrochemical reactions that produce electricity for a load (not shown in FIG. 2) of the system 50. These flows exit the fuel cell stack 60 to produce corresponding cathode and anode exhaust flows at cathode 74 and anode 64 exhaust outlets, respectively, of the stack 60. In accordance with some embodiments of the invention, the anode exhaust flow may be communicated at least in part back to the anode inlet 70, may be vented to ambient or may be communicated to the reformer 90, depending on the particular embodiment of the invention.

The cathode exhaust flow is, in general, routed to the reformer 90 for purposes of recovering hydrogen from the flow, which may have migrated from the fuel cell stack's anode chamber. However, phosphorus compounds are removed from the cathode exhaust flow by communicating the cathode exhaust flow through a phosphoric acid trap 86. From the phosphoric acid trap 86, the scrubbed cathode exhaust flow is communicated to a fuel inlet 88 of the reformer 90.

To increase the efficiency of the phosphoric acid trap 86, the incoming flow to the trap 86 is first cooled by combining the cathode exhaust flow from the fuel cell stack 60 with an incoming fuel flow 78 (such as hydrogen) at a junction 76. The resultant flow, having a lower temperature than the cathode exhaust flow that exits the fuel cell stack 60, is communicated to an inlet 82 of the acid trap 86.

The combination of the cathode exhaust with the incoming fuel flow produces a feed flow for the reformer 90. The temperature of the incoming fuel flow is relatively low (at ambient temperature, for example) relative to the temperature of the cathode exhaust flow that exits the fuel cell stack 60. For example, in accordance with some embodiments of the invention, the cathode exhaust flow from the fuel cell stack 60 may have a temperature of approximately 170° C. By combining the cathode exhaust flow that exits the fuel cell stack 60 with the relatively cooler incoming fuel flow, the temperature of the resultant flow that is scrubbed by the phosphoric acid trap 86 is significantly lower than the temperature of the cathode exhaust flow. For example, the temperature of the flow that is received at the inlet 82 of the phosphoric acid trap 86 may be between approximately 150° to 160° C., in accordance with some embodiments of the invention. In general, the scrubbing material of the phosphoric acid trap 86 is more efficient in removing phosphorus compounds from lower temperature flows. Therefore, due to the cooling effect provided by the mixing of the cathode exhaust and incoming fuel flows, the phosphoric acid trap 86 more efficiently traps phosphorus compounds, thereby producing a relatively "cleaner" feed flow to the reformer 90.

Figure 3:
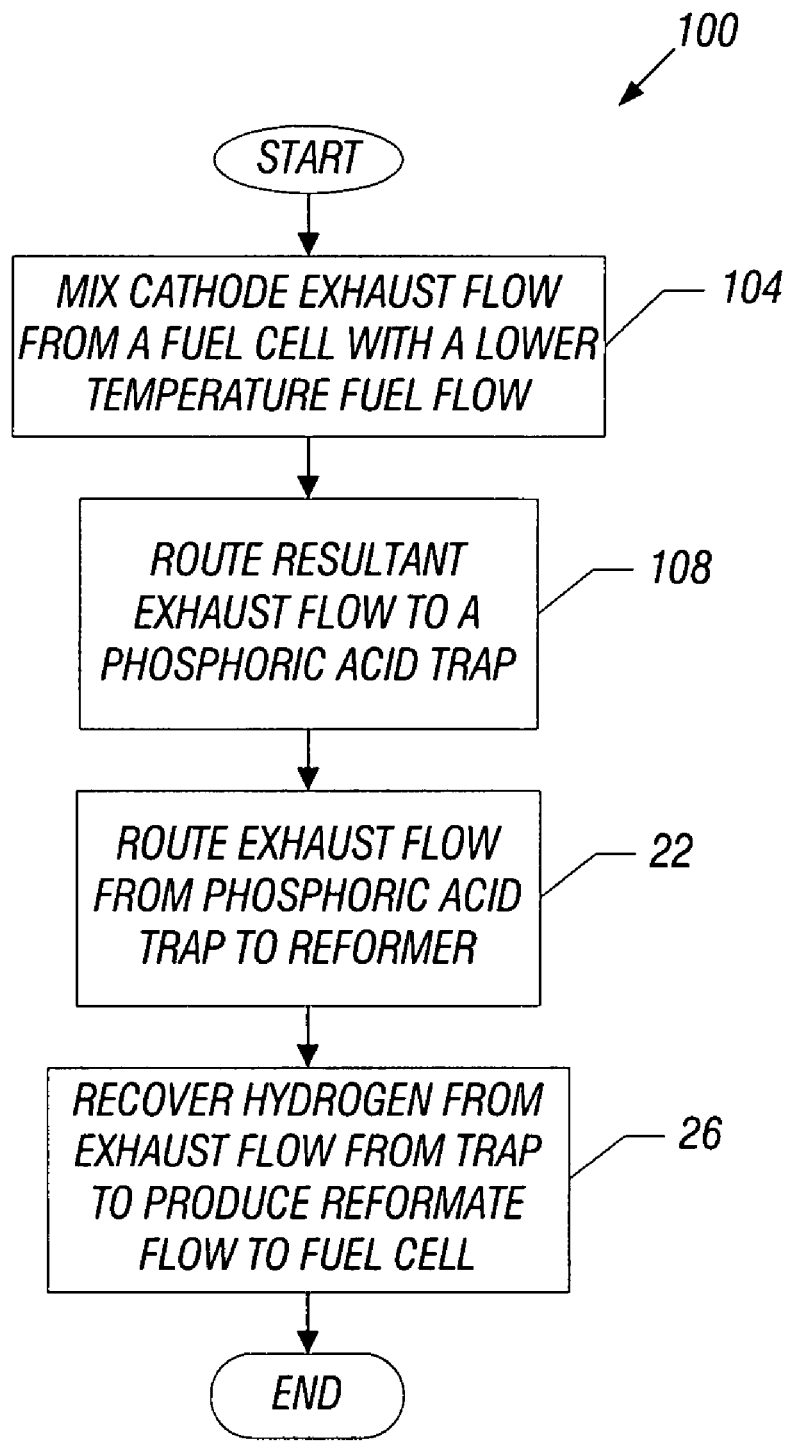

Referring to FIG. 3, to summarize, in accordance with some embodiments of the invention, a technique 100 may be used for purposes of processing a cathode exhaust flow from a fuel cell. Pursuant to the technique 100, a cathode exhaust from a fuel cell is mixed (block 104) with a lower temperature fuel flow. The resultant lower temperature exhaust flow is then routed (block 108) to a phosphoric acid trap and further processed in accordance with blocks 22 and 26, as described above in connection with the technique 10 (see FIG. 1).

Figure 4:
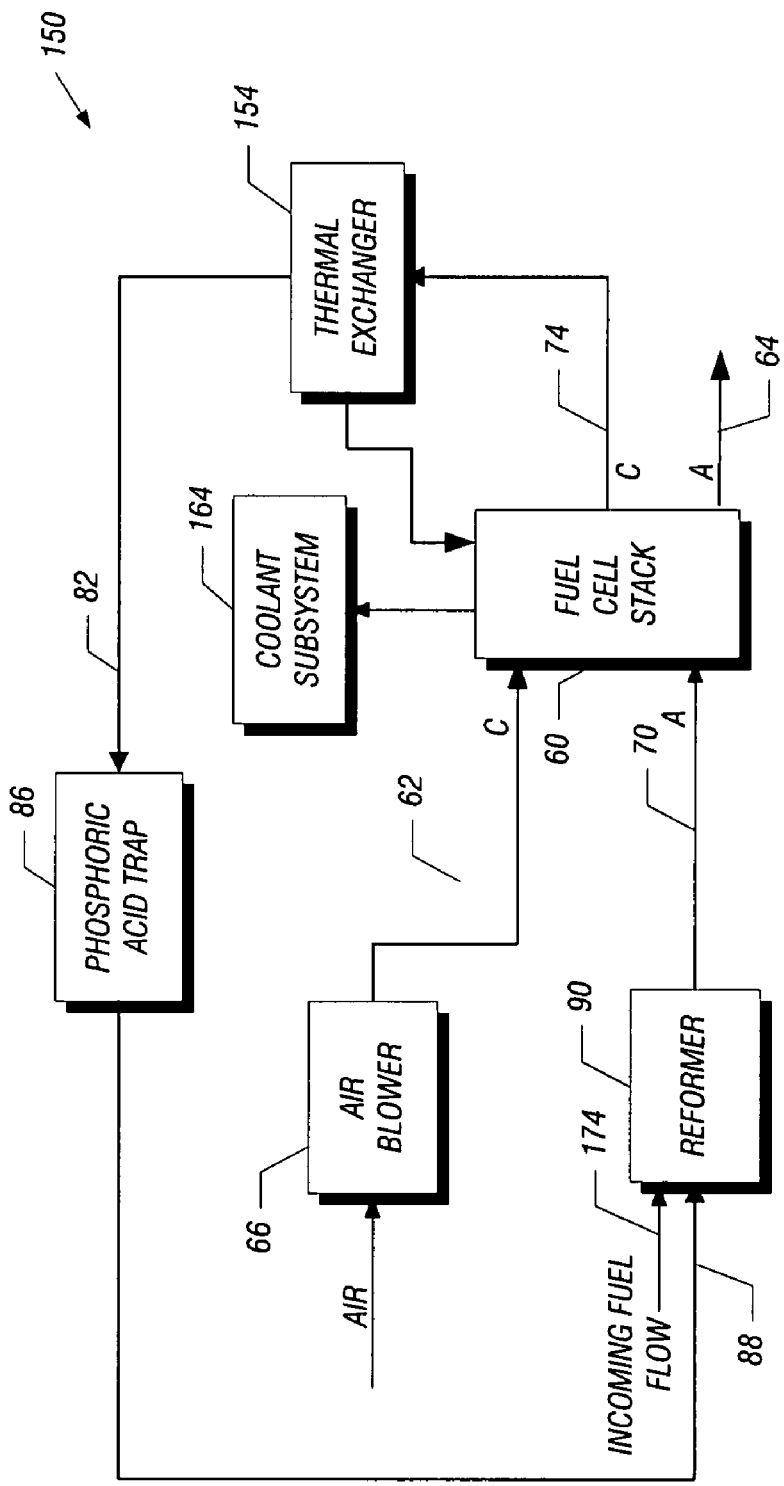

FIG. 4 depicts an exemplary embodiment 150 of a fuel cell system in accordance with another embodiment of the invention. The fuel cell system 150 has a similar design to the fuel cell system 50 (see FIG. 2), with like reference numerals being used to depict similar components. However, unlike the fuel cell system 50, the fuel cell system 150 cools the cathode exhaust flow using a different technique. In particular, in the fuel cell system 150, a thermal exchanger 154 transfers thermal energy from the cathode exhaust flow 74 to an incoming coolant inlet flow 158 to the fuel cell stack 60. Thus, in general, the fuel cell stack 60 has a temperature that is regulated by a coolant subsystem 164, which circulates a coolant flow through corresponding coolant channels of the fuel cell stack 60.

More specifically, the cathode exhaust flow is furnished to the thermal exchanger 154, which also receives a coolant inlet flow from the coolant subsystem 164. The coolant inlet flow has a significantly lower temperature for purposes of removing additional thermal energy from the fuel cell stack 60. Due to the thermal coupling provided by the thermal exchanger 154, thermal energy of the cathode exhaust flow 74 is lowered before being received at the inlet 82 of the phosphoric acid trap 86.

The coolant flow circulates through the thermal exchanger 154 and then flows into the coolant channels of the fuel cell stack 60, where thermal energy is removed from the stack 60. The coolant flows from the fuel cell stack 60 back into the coolant subsystem 164, which removes thermal energy from the coolant. In this embodiment of the invention, an incoming fuel flow may be separately provided to a fuel inlet 174 of the reformer 90 (as depicted in FIG. 4), or alternatively, the flow from the acid trap 86 may be combined with an incoming fuel flow to form a feed flow for the reformer 90 in another embodiment of the invention.

Figure 5:
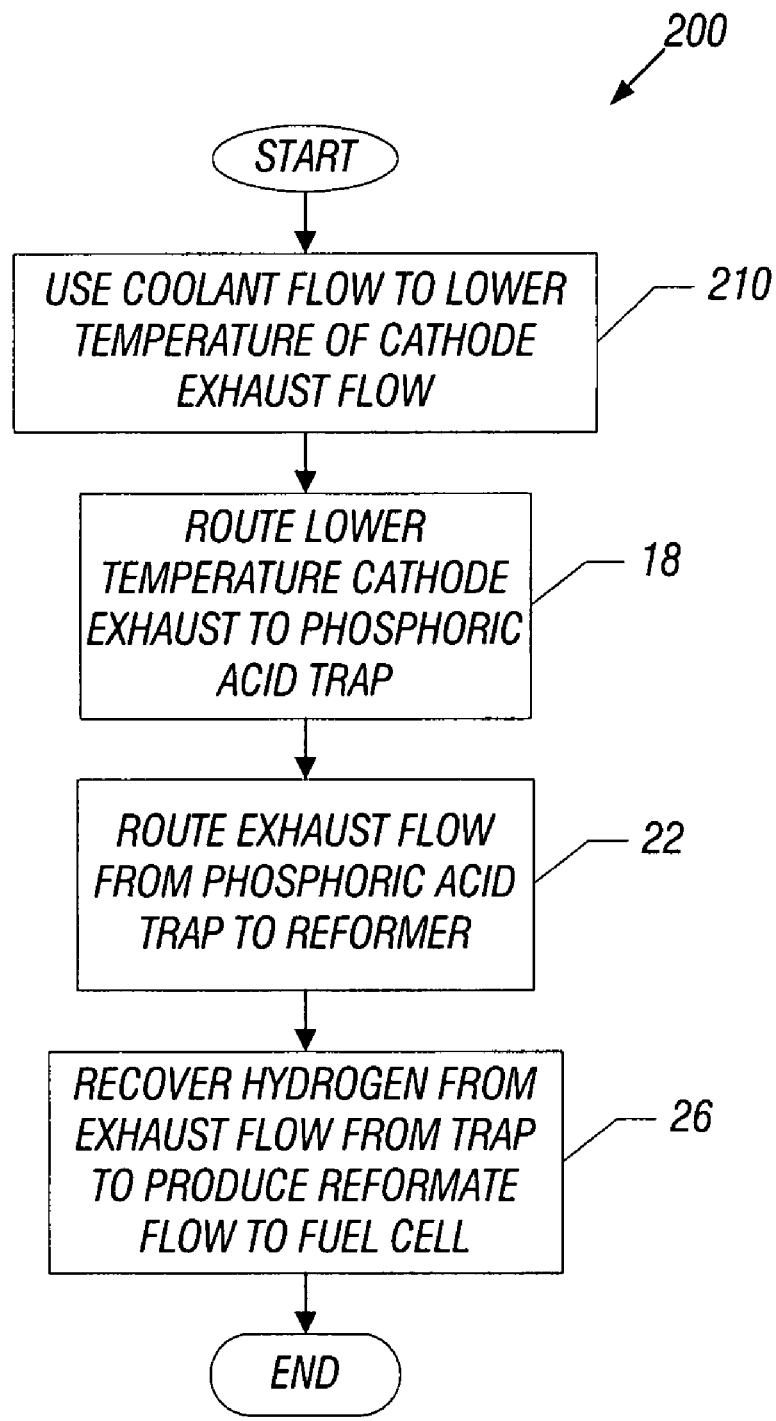

Referring to FIG. 5, to summarize, in accordance with some embodiments of the invention, a technique 200 includes using a coolant inlet flow to a fuel cell to lower the temperature of a cathode exhaust of the fuel cell, pursuant to block 210. The resultant lower temperature cathode exhaust flow is then processed according to blocks 18, 22 and 26, similar to blocks 18, 22 and 26 in a similar manner to the techniques 10 described above.

Other embodiments are within the scope of the appended claims. For example, in accordance with other embodiments of the invention, the cathode exhaust flow may be communicated in proximity to the coolant inlet flow to the fuel cell stack 60. Thus, in these embodiments of the invention, an explicit thermal exchanger is not used, as a proximity of the two flows provides sufficient cooling to improve the efficiency of phosphorus capture from the cathode exhaust flow. Therefore, many different variations are possible and are within the scope of the appended claims.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
    upstream of an inlet of a contaminant trap, lowering a temperature of a first cathode exhaust flow containing a contaminant from an electrochemical cell to produce a second cathode exhaust flow containing the contaminant, the act of lowering comprising adding fuel to the first cathode exhaust flow to lower the temperature of the first cathode exhaust flow to produce the second cathode exhaust flow;
    routing the second cathode exhaust flow to the inlet of the contaminant trap; and
    using the contaminant trap to remove the contaminant from the second cathode exhaust flow.

2. The method of claim 1, further comprising:
    reforming an outgoing flow from the contaminant trap to produce a reformate flow.

3. The method of claim 2, further comprising:
    communicating the reformate flow to the electrochemical cell.

4. The method of claim 1, wherein the fuel has approximately an ambient temperature.

5. The method of claim 1, wherein the first cathode exhaust flow has a temperature of approximately 170 degrees Celsius, and the second cathode exhaust flow has a temperature of approximately 150 to 160 degrees Celsius.

6. The method of claim 1, wherein the act of routing the second cathode exhaust flow to the inlet of the contaminant trap comprises routing the second cathode exhaust flow to an inlet of a phosphoric acid scrubber.

7. The method of claim 6, wherein the fuel cell comprises a phosphoric acid fuel cell and the act of lowering improves the ability of the phosphoric acid scrubber to remove contaminants from the scrubber.

* * * * *